(12) United States Patent
Weiss et al.

(10) Patent No.: US 11,415,528 B2
(45) Date of Patent: Aug. 16, 2022

(54) METHOD AND APPARATUS FOR AUTOMATED IN-LINE INSPECTION OF OPTICALLY TRANSPARENT MATERIALS

(71) Applicant: WDI WISE DEVICE INC., Richmond Hill (CA)

(72) Inventors: Adam Weiss, Toronto (CA); Aleksey Lopatin, Markham (CA)

(73) Assignee: WDI WISE DEVICE INC., Richmond Hill (CA)

( * ) Notice: Subject to any disclaimer, the term of this patent is extended or adjusted under 35 U.S.C. 154(b) by 124 days.

(21) Appl. No.: 16/754,887

(22) PCT Filed: Oct. 10, 2018

(86) PCT No.: PCT/CA2018/051276
§ 371 (c)(1),
(2) Date: Apr. 9, 2020

(87) PCT Pub. No.: WO2019/071345
PCT Pub. Date: Apr. 18, 2019

(65) Prior Publication Data
US 2021/0372945 A1    Dec. 2, 2021

Related U.S. Application Data

(60) Provisional application No. 62/570,261, filed on Oct. 10, 2017.

(51) Int. Cl.
*G01N 21/958* (2006.01)
*G01N 21/88* (2006.01)

(52) U.S. Cl.
CPC ....... *G01N 21/958* (2013.01); *G01N 21/8806* (2013.01); *G01N 21/8851* (2013.01); *G01N 2021/8825* (2013.01)

(58) Field of Classification Search
CPC ............ G01N 21/958; G01N 21/8806; G01N 21/8851; G01N 2021/8825
USPC ...................................... 356/239, 1
See application file for complete search history.

(56) References Cited

U.S. PATENT DOCUMENTS

2011/0036996 A1* 2/2011 Wolleschensky .. G01N 21/6458
250/459.1
2021/0239955 A1* 8/2021 Dai .................... G01N 21/6428

\* cited by examiner

*Primary Examiner* — Tri T Ton
(74) *Attorney, Agent, or Firm* — Gowling WLG (Canada) LLP

(57) ABSTRACT

A method and system for automated in-line inspection of optically transparent material is disclosed herein. The method includes illuminating a top and bottom surface of the optically transparent material with at least one sheet of light and then generating an image based on light that is received by an imaging device. The image that is generated may either be a bright field image or a dark field image.

20 Claims, 16 Drawing Sheets

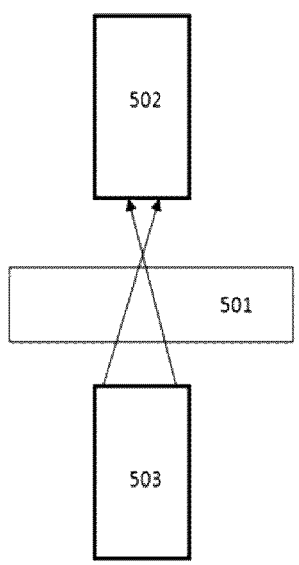 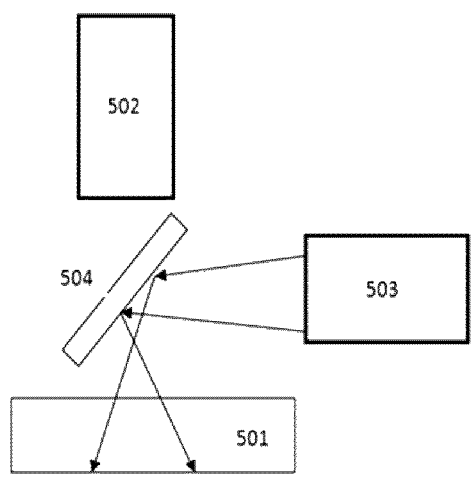 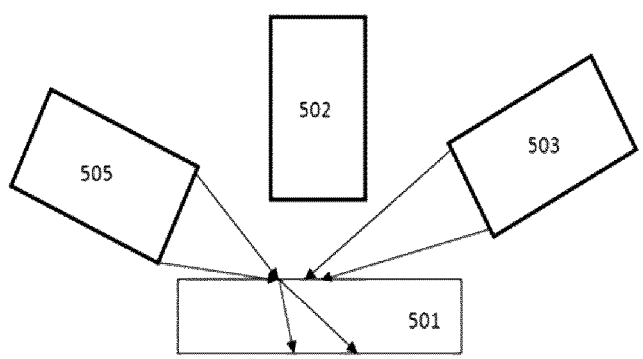 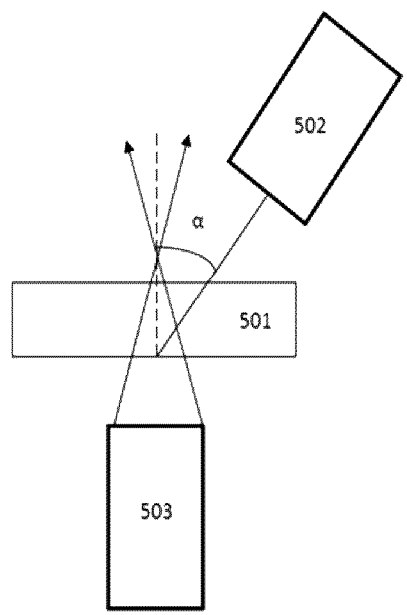
FIG. 6 a
FIG. 6 b
FIG. 6 c
FIG. 6 d

METHOD AND APPARATUS FOR AUTOMATED IN-LINE INSPECTION OF OPTICALLY TRANSPARENT MATERIALS

CROSS-REFERENCE TO OTHER APPLICATIONS

This application claims the benefit of priority of U.S. Provisional Patent Application No. 62/570,261 filed Oct. 10, 2017 which is hereby incorporated by reference.

FIELD OF THE DISCLOSURE

The present disclosure is generally related to the inspection of optically transparent materials, and more specifically, is directed at a method and apparatus for automated in-line inspection of optically transparent materials.

BACKGROUND

The glass manufacturing industry has high quality standards that need to be satisfied when it comes to product manufacturing. Because of high production rates, automated inspection is required. Employing a number of physical principles, numerous efforts have been made through the years to develop systems that are suitable for automated in-line inspection of glass web and glass panels. Over the years, the industry has established extremely high quality requirements for flat panel display (FPD) glass.

The requirements for reliable detection, sizing and classification of a large variety of intrinsic and manufacturing/processing glass defects have applied strong limitations on the design of inspection systems, narrowing down the choice of effective solutions suitable for the above-mentioned purposes.

For several glass inspection applications, the inspection system is required to detect the position of a defect or an object of interest relative to the glass surface. For FPD glass inspection, electronic components are typically deposited on one of the FPD glass surfaces. This is generally referred to as Surface A in the industry. Surface A should be completely free from defects as they may disrupt the operation or functionality of deposited electronic components. The opposite surface, which is referred to as Surface B in the industry, should be free from relatively large defects.

Many current solutions use the triangulation approach to address this issue. One well-known triangulation approach implementation is stereo vision. To locate the position of a defect or object of interest relative to glass surfaces, two cameras are used. However, stereo vision channel systems generally have a relatively small field of view (FOV) in comparison with the size of the glass panel being inspected. As such, stereo vision channels systems require upstream glass defect detection channels. These systems may review only a limited number of defects per given time interval and may experience problems if a large number of defects are detected. Therefore, since in-line inspection systems are designed to provide 100% glass surface inspection, for in-line inspection systems using the stereo vision approach, the number of cameras needed is increased and may be at least double versus the number of cameras required for a "defect detection only" system. The increased need for hardware also increases the cost for installing such a system.

Another type of system that is currently used may be seen as a directional light source and telecentric imaging system. This approach is suitable for applications where low numerical aperture(NA)/large depth of field (DOF) optics may be used, however, it is not as suitable for high resolution/high NA optical applications, when imaging systems have a DOF smaller or equal to the thickness of the glass panel being inspected. Defect images, acquired with high resolution/high NA optical systems through inclined glass may experience severe degradation due to inevitable astigmatism.

Another limitation to this and similar approaches is that the presence of various glass panel elements (electrodes, antennas, heaters, holes, glass edges etc.) will complicate the image processing and inspection.

Therefore there is provided a novel method and apparatus for automated in-line inspection of optically transparent materials.

SUMMARY

The disclosure is directed at a method and apparatus for automated in-line inspection of optically transparent material. In one aspect, there is provided a method to determine the position of a defect or object of interest relative to surfaces of the optically transparent material that overcomes or mitigates one or more disadvantages of known systems and methods. In another aspect, there is provided an optically transparent material inspection system to provide in-line inspection of optically transparent materials, such as flat panel display (FPD) glass web and panels. In another embodiment, the method and system of the disclosure may be used to detect, size and classify defects or objects of interest in the optically transparent material.

In one embodiment, one sheet of light is focused and oriented such that it illuminates a narrow strip on the top surface of the glass within an imaging device, or imaging module field of view (FOV) and does not illuminate the bottom surface of the glass within the imaging device, or imaging module FOV. A second sheet of light passes through the glass being inspected and is focused and oriented such it illuminates a wide strip on the bottom surface of the glass within the imaging device or imaging module FOV and doesn't illuminate top surface of the glass within imaging device or imaging module FOV. As such, one pair of light sheets may be used to cover the whole imaging device or imaging module FOV. Alternatively, several pairs of light sheets may be used to cover the whole imaging device or imaging module FOV.

In a preferred embodiment, the imaging device or imaging module uses a contact image sensor (CIS) as line-scan imager. It is positioned such that the CIS object plane coincides with the top surface of the glass being inspected with the FOV within the narrow illuminated strip on the top surface.

In a first aspect of the disclosure, there is provided a method of transparent optical material inspection including transmitting at least one sheet of light at an object of interest within the transparent optical material; receiving light at an imaging device after the at least one sheet of light has contacted the transparent optical material; and generating an image based on the received light; wherein a width of each of the at least one sheet of light is not wider than a point spread function (PSF) of the imaging device.

In another aspect, transmitting at least one sheet of light includes transmitting the at least one sheet of light at a top surface and a bottom surface of the transparent optical material. In another aspect, a width of the at least sheet of light at the top surface is narrower than a width of the at least one sheet of light at the bottom surface. In a further embodiment, transmitting the at least one sheet of light at a top surface and a bottom surface of the transparent optical material includes transmitting a first sheet of light at the top surface; and transmitting a second sheet of light at the bottom surface.

In yet another aspect, receiving light at an imaging device includes for a bright field configuration, receiving light that has passed through the transparent optical material. In yet a further aspect, receiving light at an imaging device includes for a dark field configuration, receiving scattered, reflected or refracted light after the light has passed through the transparent optical material.

In yet another aspect, transmitting the first and second sheets of light includes transmitting the first sheet light from a position opposite the imaging device with respect to the transparent optical material; and transmitting the second sheet of light from a position opposite the imaging device with respect to the transparent optical material. In another aspect, transmitting the first and second sheets of light includes transmitting a sheet of light towards a beam splitter; and beam-splitting the sheet of light and directing a first portion of the beam-split light as the first sheet of light towards the transparent optical material. In an aspect, the method further includes directing a second portion of the beam-split light as the second sheet of light towards the transparent optical material.

In yet another aspect, the at least one sheet of light is diverged or converged towards the object of interest.

In a further aspect, the first sheet of light is transmitted within a field of view (FOV) of the imaging device. In another aspect, the second sheet of light is transmitted within a FOV of the imaging device. In yet another aspect, the method includes transmitting the image to an image processing device to determine location of the object of interest associated with optically transparent material.

In another aspect of the disclosure, there is provided a system for transparent optical material inspection including an imaging device; at least one source of light for transmitting at least one sheet of light at an object of interest associated with transparent optical material; wherein at least one of the at least one sheet of light has a width narrower than a point spread function (PSF) of the imaging device.

In another aspect, the system further includes a conveyor system for supporting and moving the transparent optical material; wherein the imaging device is a line-scan imager. In another aspect, the at least one source of light transmits a first sheet of light at a Surface A of the transparent optical material and a second sheet of light at a Surface B of the transparent optical material. In yet another aspect, the at least one source of light includes two sources of light, one of the sources of light for generating the first sheet of light and a second of the sources of light for generating the second sheet of light.

DESCRIPTION OF THE DRAWINGS

Embodiments of the present disclosure will now be described, by way of example only, with reference to the attached Figures.

FIGS. 6a to 6d are schematic diagrams of optical configurations for in-line inspection;

DETAILED DESCRIPTION

Figure 1:
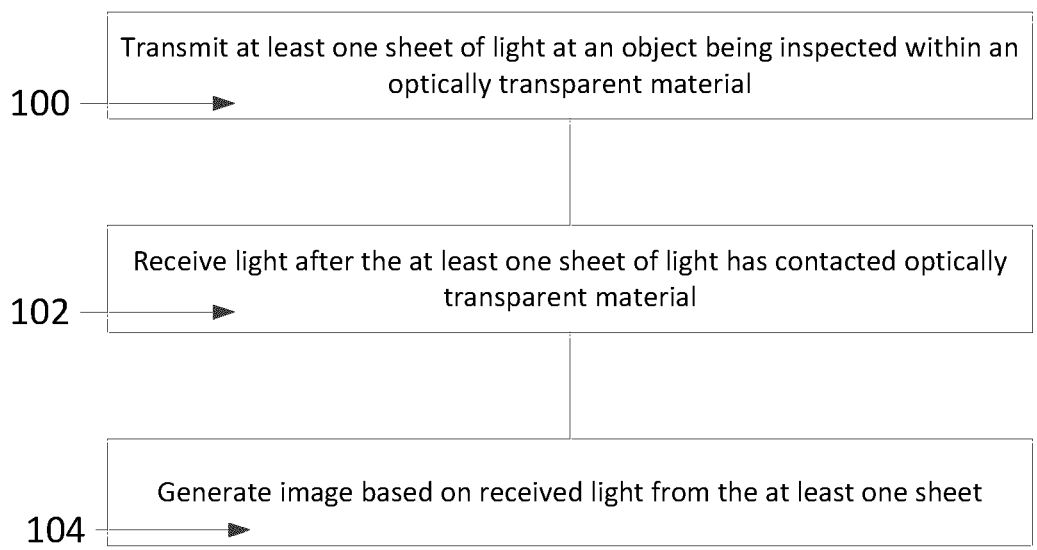
FIG. 1 is a flowchart outlining a method of automated in-line inspection of an optically transparent material.

The disclosure is directed at a method and system for automated in-line inspection of an optically transparent material. In one embodiment, at least one sheet of light is directed from a light source at the optically transparent material where the light either passes through the material or is scattered, reflected or refracted after contacting a defect of an object of interest associated with the material such as within, or on a surface of the material. The light exiting out of the material (either directly, scattered, reflected or refracted) is then received by an imaging device that generates an image based on the light received. In a preferred embodiment, a width of the sheet of light that contacts the transparent material is less than a point-spread-function (PSF) of the imaging device. This is preferably measured with respect to the scanning direction.

For ease of understanding, throughout the specification, the term "glass" will be used to define an object of inspection or being inspected. Other objects of inspection include, but are not limited to, a glass panel, a glass web or other optically transparent substances or materials.

To better understand the disclosure, a background to image formation is provided. Object image intensity formed by the imaging system in its simplest form may be described by the Fredholm integral equation of the second kind (Equation (1)).

$$I(x,y) = \iint O(u,v) \times PSF(\xi, \eta, u, v) du\, dv + N(x,y) \quad (1)$$

where I(x, y) represents image intensity in point with coordinates x,y in the image plane;

O(u, v) represents object intensity in point with coordinates u,v in the object plane;

coordinates $\xi$, $\eta$ are related to coordinates x,y in a following way: $\xi = x/M$, $\eta = y/M$, where M is the imaging system magnification;

PSF($\xi$, $\eta$, u, v) represents PSF defined in the object plane; and

N(x, y) represents image noise.

In order to assist in the understanding of Equation 1, assumptions may be made. These assumptions include 1) the PSF doesn't depend on w coordinate in the object space related coordinate system $\{\vec{u}, \vec{v}, \vec{w}\}$ whereby this assumption is valid if the object spread in the w direction is smaller than the imaging system DOF; 2) the imaging system magnification M is the same in both the x and y directions whereby this assumption is valid for non-anamorphic imaging systems; and 3) the imaging system magnification M doesn't depend on w whereby this assumption is valid for telecentric imaging systems and for non-telecentric imaging systems, the difference between optical magnifications for two object planes AM, separated with distance t is described with Equation (2)

$$\Delta M = \frac{f \times t}{(f-d)^2 - t \times (f-d)} \quad (2)$$

where f represents imaging system focal distance; and
d represents distance from imaging system (considered as thin lens) to the first object plane.

As it follows from Equation (2), the difference between optical magnifications for two object planes, separated with distance t is small, when |f−d| is large in comparison with t. With all factors taken into account, Equation (1) and its solution becomes more complicated. In the current disclosure, this equation or calculation is not required.

Assuming object intensity in the object plane is described by two-dimensional Dirac δ-function with the following properties (as shown in Equation (3)) (which may be considered as mathematical point definition), $$\delta(u,v) = \begin{Bmatrix} +\infty, & u=0, v=0 \\ 0, & u \neq 0, v \neq 0 \end{Bmatrix} \quad (3)$$

$$\int_{-\infty}^{+\infty}\int \delta(u,v)dudv = 1$$

then, the image intensity distribution in the image plane will be equal to a magnified PSF, defined in the object plane.

Real objects differ from mathematical points, however, if the optics magnified object size is much smaller than "optics magnified" PSF, its image size and shape won't deviate much from the PSF.

At first glance, the object image size can't be smaller than "optics magnified" PSF footprint, however, this is not the case.

Many imaging systems use line-scan imagers, such as, but not limited to, line-scan cameras, contact image sensors (CIS), direct imaging video technology (DIVIT) sensors and the like. These imagers don't acquire the object image instantly but acquire it line-by-line and then reconstruct the full image with software and/or firmware or both. To obtain the object image, the line-scan imager and the scanned object, or object being inspected, should move relative to each other.

If one would interrupt object illumination at a time of image acquisition—the acquired image shape will deviate from expected in correspondence with Equation (1). In particular, the acquired image size may be smaller than "optics magnified" PSF footprint size.

There are at least two ways to execute such an interruption. The first approach is dynamic—when light is turned on and off at a time of the object image acquisition. The second approach is static, when the object illumination area is smaller than the PSF in the object plane. This approach is the basis of the method and system of the disclosure.

Turning to FIG. 1, a flowchart outlining a method of automated in-line optically transparent material, such as a glass panel, inspection is shown. In a preferred embodiment, the method of the disclosure may be used for the inspection of flat panel display (FPD) glass. In a further embodiment, both surfaces (seen as Surface A and Surface B in the industry) of an optically transparent material being inspected are illuminated by at least one light source to assist in determining if there is a defect within or on a surface of the material being inspected and its location within or on a surface of the glass. As such, the method of the disclosure may be seen as one that properly illuminates both surfaces of an optically transparent material being inspected. In a preferred embodiment, the imaging device is a line-scan imager, as will be discussed in more detail below.

Initially, at least one sheet of light is transmitted towards an optically transparent material that is to be inspected (100). In one embodiment, the at least one sheet of light is directed at a defect or object of interest in the glass, or glass panel. In another embodiment, the at least one sheet of light is directed at one or both of the top surface (Surface A) and the bottom surface (Surface B) of the glass panel. In another embodiment, the at least one sheet of light includes two sheets of light whereby one sheet of light is directed at the top surface of the glass panel and the second sheet of light is directed at the bottom surface of the glass panel. The at least one sheet of light may be provided by one or more light sources. The positioning of the light source or light sources with respect to the imaging device depends on the configuration or application being performed as will be discussed below.

One characteristic of each of the at least one sheets of light is that its width is no more than a PSF of the imaging device. In one embodiment, the width of the sheet of light at the top surface (or Surface A) is narrower than a width of the sheet of light at the bottom surface (or Surface B) which is no wider than the width of the PSF of the imaging device. This width is preferably measured in the direction of scanning.

In one embodiment, the sheet or sheets of light is/are arranged to be diverging or converging beams at a predetermined height with respect to the material being inspected or the defect. If only surface inspection is being performed, two separate beams with different light sheet widths may be used.

After the light has been transmitted or passed through or contacted the glass panel, the light is received at an imaging device (102). This light may be received directly from a light source through the glass panel or may be received after being scattered, reflected, refracted and the like by the defect or object of interest within or on a surface of the glass panel as the light passes through glass panel. The type or characteristics of the light being received by the imaging device may be determined by the imaging application being performed, such as within a bright field configuration or a dark field configuration.

Based on the light received, an image can then be generated by the imaging device (104). In some embodiments, the image that is generated is a bright field displayed with a dark spot representing the defect or object of interest within or on the surface of the glass panel.

Alternatively, the image that is generated may be a dark field with spots of scattered light representing the defect(s) or object(s) of interest.

In other words, in some embodiments, the image is generated after the imaging device receives the sheet or sheets of light that have passed through the glass being inspected. In other embodiments, the image is generated based on the light (from the sheet or sheets of light) that has been either scattered, refracted or reflected after contact with the defect or object of interest in the glass panel.

In another embodiment, where the imaging device is a line-scan camera, the imaging device moves in a scanning direction such that the resulting image is generated line-by-line rather than by a single shot of light.

Figure 2:
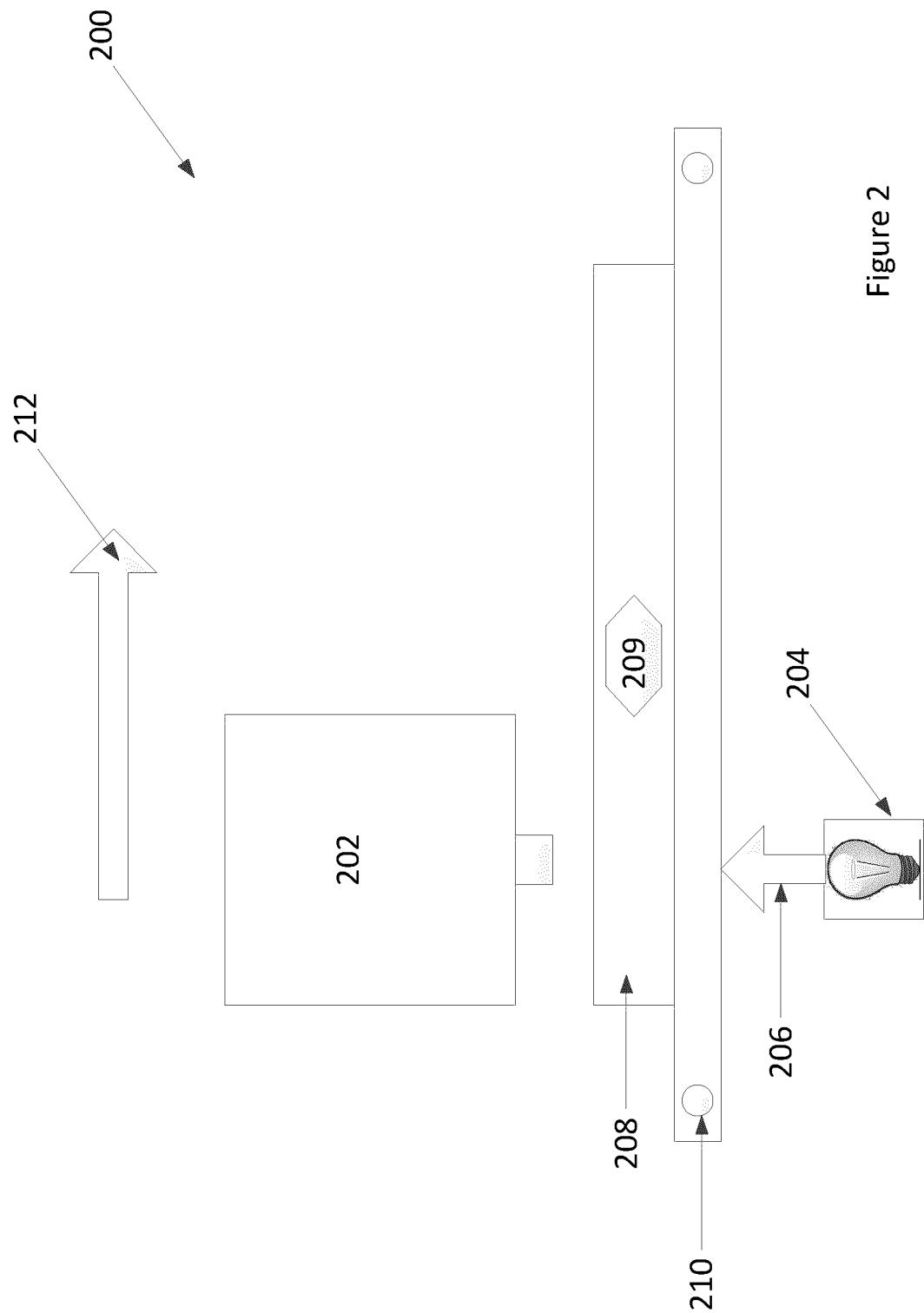
FIG. 2 is a schematic diagram of a system for automated in-line inspection of an optically transparent material.

Turning to FIG. 2, a schematic diagram of a system for automated in-line inspection of a transparent material is shown. The system 200 includes an imaging device 202, such as, but not limited to, a line-scan camera, a CIS or DIVIT sensors. The imaging device 202 captures light that is transmitted by a light source 204. In some embodiments, there may be more than one light source. In one embodiment, the light source emits light in the form of sheets of light. Although shown as being directly transmitted from the light source 204 to the imaging device 202, the light (schematically shown as arrow 206) may also be transmitted to the imaging device 202 via reflection, scattering, refraction or any other methods that will be understood by one skilled in the art. In the current embodiment, the imaging device 202 captures the light from the light source and generates an image of the glass 208 being inspected. In other embodiments, the light is received by the imaging device after the light has been scattered, reflected or refracted after contact with the defect or object of interest 209 in the glass panel. As will be understood, the type of image being generated may depend if a bright field or a dark field configuration is used. In the current embodiment, the glass 208 is atop a conveyor 210 that moves in the direction of arrow 212. As outlined above, when the imaging device 202 is a line-scan imaging device, the imaging device 202 and the glass 208 being inspected move with respect to each other. In some embodiments, the light source 204 may move as well, preferably in the direction of arrow 212. The motion between the glass and the imaging device is preferably at a constant speed.

Figure 3:
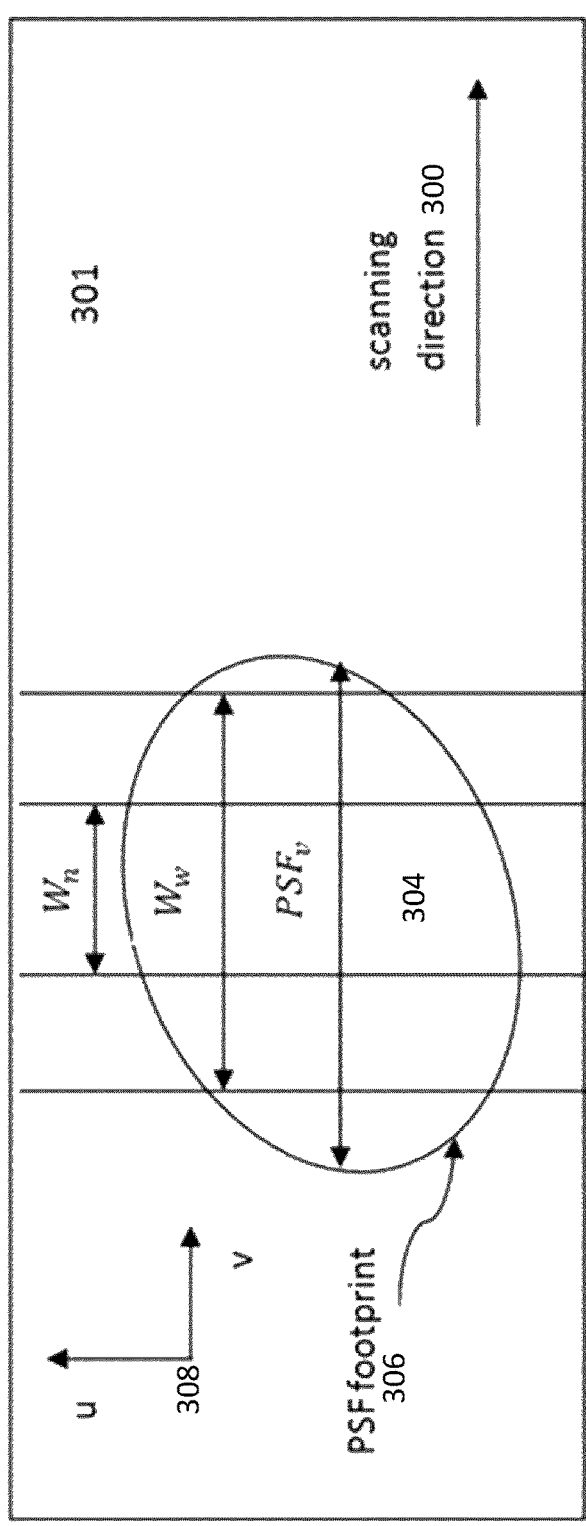
FIG. 3 is a schematic view of a glass panel under inspection.
Figure 4:
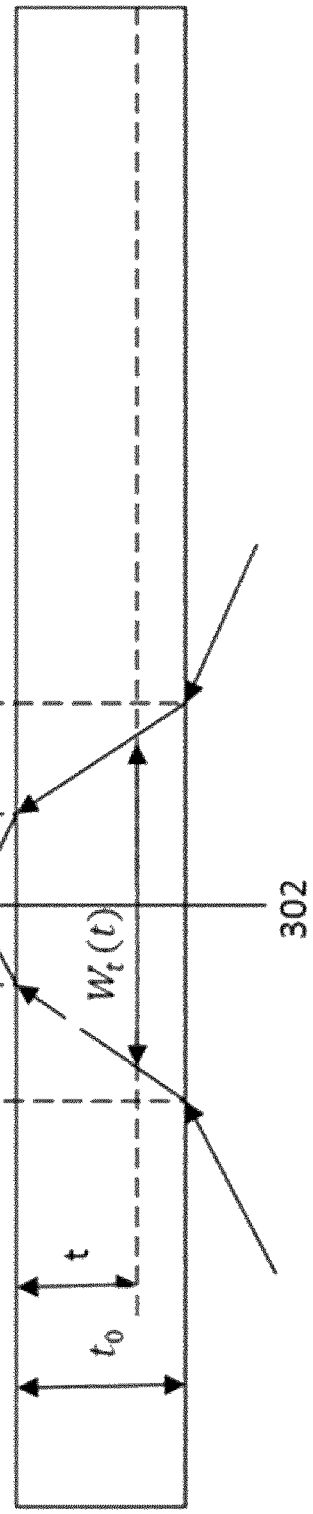
FIG. 4 is a schematic view of a glass panel under inspection.
Figure 5:
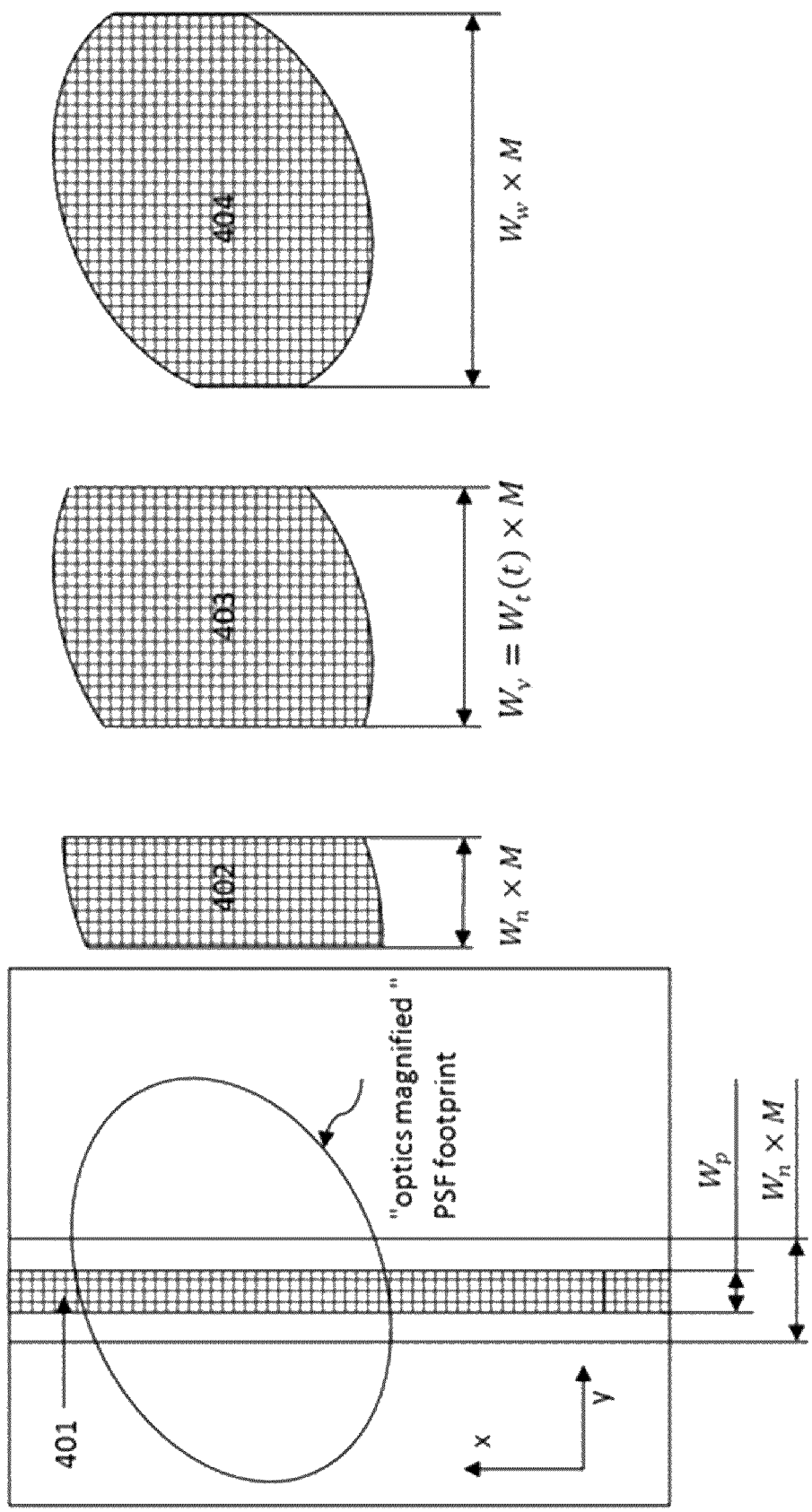
FIG. 5 are schematic diagrams of images of a point defect.

FIGS. 3 to 5 provide schematic diagrams to further describe the method and system of the disclosure.

Turning to FIGS. 3 and 4, a schematic top view (FIG. 3) and a schematic side view (FIG. 4) of a glass panel under inspection is shown. In FIGS. 3 and 4, the glass panel (or object being inspected) 301 is being inspected in a scanning direction denoted by scanning direction arrow 300. Furthermore, for explanation purposes, within or on a surface of the glass panel is a point defect 304 having an image footprint 306 equal to the PSF of the imaging device. For explanation purposes, a co-ordinate system {v,u} 308 is used to define scanning and illumination directions. In the current example of operation, it is assumed that the glass panel 301 is illuminated from a light source located under the glass 301 from a bottom position with at least one sheet of light 302 in the u direction (as per the co-ordinate system 308). It is expected that a length of the sheet of light is sufficient for adequate illumination of the glass panel inside the whole line-scan imager field of view (FOV). As will be understood, when the sheet of light hits the glass panel, it may be seen as a strip of light. The light sheet intensity distribution should be preferably uniform (constant) over its cross-section normal to the direction of light propagation.

In a preferred embodiment, the sheet of light 302 is arranged such that its width $W_n$ at one surface (such as the top surface 310 or Surface A) of the glass panel 301 being inspected is narrower than its width $W_w$ on the opposite surface (such as the bottom surface 312 or Surface B) of the glass panel 301 being inspected. As shown in FIGS. 3 and 4, a PSF triangulation method is shown. In the current embodiment, a single diverging/converging beam is used. The point defect image that is generated by the imaging device depends on what section of the light beam (or sheet of light) travels inside the FOV of the imaging device.

If only surface inspection is required, two sheets of light may be used with a narrow sheet illuminating the top surface 310 and a wide sheet of light illuminating the bottom surface 312. In one embodiment, as outlined below, the narrow and wide sheets of light may be provided by a single source of light (as schematically shown in FIG. 6d), while in other embodiments, the narrow and wide sheets of light may be provided by two light sources, preferably one for the top surface and one for the bottom surface (such as schematically shown in FIG. 6c).

In an embodiment, as shown in FIG. 4, the light sheet having width $W_n$ (when it contacts a surface of the glass) is preferably smaller than a PSF cross-section in the v-direction or scanning direction 300 whereby $W_n < PSF_v$ and light sheet width $W_w$ larger than light sheet width $W_n$. In one embodiment, $W_w$ may be equal to $PSF_v$. In a preferred embodiment, $W_w$ is not greater than $PSF_v$ as it may create an ambiguity in the defect position determination unless detection is only required for surface inspection. In some specific embodiments, $W_w$ may be greater than $PSF_v$. As will be understood, light sheet width is not constant and as the light sheet width changes, the point defect image footprint will change depending on what section of the light sheet the point defect passes through.

Assuming that the light sheet width $W_t(t)$ changes linearly from one surface to another in correspondence with Equation (4):

$$W_t(t) = W_n + \frac{t \times (W_w - W_n)}{t_0} \quad (4)$$

where $t_0$ represents is glass thickness; and
t represents is distance from glass surface, illuminated with narrow strip of light to the plane of interest inside the glass,
a line-scan imager with photosensitive area width can be selected.

$$W_p \leq W_n \times M. \quad (5)$$

As schematically shown in FIG. 5, one or more lines of photosensitive elements 401 may be used if their cumulative width satisfies Equation (5).

For simplicity, it is assumed that the point defect is imaged within the line-scan system. Its reconstructed image width $W_y$ in y direction can be represented by Equation (6)

$$W_y = W_t(t) \times M \quad (6)$$

By resolving Equation (6), the position of a defect or object of interest inside the glass panel can be determined and calculated from one of the surfaces, illuminated with narrow strip of light. This may be represented by Equation (7).

$$t = \frac{(W_y - W_n \times M) \times t_0}{(W_w - W_n) \times M} \quad (7)$$

Turning back to FIG. 5, image 403 shows a point defect image footprint with width $W_y = W_t(t) \times M$. Other image footprints are shown as a comparison. Image 402 shows a point defect on the top surface with width in y direction $W_{top}=W_n \times M$ and image 404 shows a point defect on the bottom surface with width in y direction $W_{bot}=W_w \times M$. If the defect is not of point nature, its model may be used to perform analogous calculations.

As a reconstructed image has pixilated nature, Equation (7) is typically used with an imager pixel size in y direction $p_y \gg W_y$, however, in some scenarios, this may not be realistic. In these scenarios, variational applied mathematics methods may be used to derive "best fit" t value, based on acquired pixilated image intensity distribution.

In order to further understand the method of the disclosure, certain actions, technical details should be understood. For instance, the glass, or object being inspected is illuminated in the inspected area with a sheet or sheets of directional light. Also, the at least one sheet of light may be created or generated by a single light source or by a plurality of different light sources. Light sheet intensity distribution should be preferably uniform over its cross-section, normal to the light propagation direction. A width of the sheet of light in the web direction monotonically changes with the inspected glass thickness. Also, the width of the sheet of light is narrower at one side of the glass and wider at the opposite side of the glass. More specifically, the narrow light strip width is smaller than the PSF cross-section in v direction $W_n < PSF_v$. The wide light strip width is larger than $W_n$: $W_w > W_n$, but smaller or equal to PSF cross-section in the scanning, or v, direction $W_w <= PSF_v$. Also, if only surface defects are of interest, the glass surfaces may be illuminated with only two sheets of light, however, more may be used with one surface illuminated with the narrow light sheet (or strip) and the opposite surface illuminated with the wide light sheet (or strip). Wide light strip width in this case may be larger than PSF cross-section in v direction $W_w > PSF_v$. Another detail to understand is that at which surface the light sheet is narrower and at which surface the light sheet is wider depends on the application. Also, the surface closest to the imaging device is dependent on the application. While directional light is preferred for the system and method of the disclosure, diffused and semi-directional light may be used, provided necessary measures are undertaken to confine generated illumination within specified spatial boundaries. Furthermore, different inspection techniques, such as disclosed below are compatible with the method of the disclosure.

For illustrative, and simplicity, it is assumed that the inspected glass is positioned horizontally where a top surface (Surface A) of the glass is illuminated with the narrow sheet of light and a bottom surface (Surface B) of the glass is illuminated with the wide sheet of light. The imaging device or system is positioned above the glass being inspected with its optical axis under an angle α to glass normal, (which may or may not be equal to 0).

Turning to FIGS. 6a to 6d, schematic diagrams of different optical configurations are shown. In each of the examples, it is assumed that the glass panel being inspected 501 is moving from left to right for explanation purposes. It will be understood that the glass panel may move in any direction and the imaging system 502 and light source 503 positioned accordingly based on the principles disclosed in the disclosure with light sheets perpendicular to the plane of the Figures.

The configuration of FIG. 6a may be seen as a transmissive bright field configuration. In this embodiment, the light source 503 is located on a side opposite the imaging device 502 with respect to the glass panel being inspected. The light source 503 and the imaging device are located approximately directly across from each other. The light source 503 transmits a light sheet that is received by the imaging device 502. The configuration may also be used for polarization contrast inspection whereby the transmitted light polarization state is analyzed. The configuration may also be suitable for luminescent inspection when excitation light (from the sheet of light) is blocked inside the imaging system 502.

The configuration of FIG. 6b may be seen as a reflective bright field configuration. In this configuration, the light source 503 transmits a sheet of light towards a beam splitter 504 that reflects the light towards the glass panel being inspected 501. The light is then reflected back up towards the imaging device 502. The configuration may also be used for polarization contrast inspection (where the reflected light polarization state is analyzed) or luminescent inspection where the reflected excitation light is blocked inside the imaging system 502.

The configuration of FIG. 6c may be seen as a reflective dark field configuration. In this embodiment, the system includes the first light source 503 and a second light source 505 that each transmit a sheet of light at the glass panel being inspected 501. The sheets of light propagate away from the imaging device 502 which receives light scattered, refracted or reflected by defects or objects of interest. This configuration may also be used for polarization contrast inspection where the back scattered light polarization state is analyzed or may be used for luminescent objects inspection.

The configuration of FIG. 6d may be seen as a transmissive dark field configuration. In this embodiment, the light source 503 is located on an opposite side of the glass panel being inspected 501 from the imaging device 502. Unlike the embodiment of FIG. 6a, the imaging device is located at an angle with respect to the light source 503. The light sheet from the light source is scattered by defects or objects of interest residing at or within or on the surface of the glass panel 501 and that forward scattered light may then be received by the imaging device so that an image can be generated. This configuration may also be used to analyze the light for contrast inspection by analyzing the forward scattered light polarization state. This configuration may also be used for luminescent objects inspection.

In a preferred embodiment, the imaging device is preferably a line-scan imaging device as area scan cameras are less suitable for in-line applications. Area scan imaging devices may be used for imaging system development and/or alignment. Also, in one embodiment of the disclosure, the selected pixel size for use with the current system is smaller than used in current systems. The selection of smaller sized pixels is seen as being counter to current technologies. In the current system, the smaller pixels the better, assuming that photosensitivity and low noise requirements are still met. The use of these smaller pixels improve the method outlined above.

For the system and method of the disclosure, assuming the optical system has diffraction limited performance, it is expected to use imagers with pixel size p calculated according to Equation (8)

$$p = R \times M/2 \qquad (8)$$

where R represents the system optical resolution in a sense of Rayleigh criterion. Using imagers with smaller pixels usually is considered to be excessive.

However, for the system and method of the disclosure, the defect pixilated image size in the y direction is originally defined with accuracy in one pixel such that it introduces inevitable errors in defect position calculations. To reduce these errors, the pixel size should be reduced to the smallest possible limit and applied mathematics methods may be used to reduce pixilation noise influence on the defect position calculations results.

Excessive pixel size reduction will reduce the system light sensitivity and will increase electronics noise due to increased imaging device bandwidth, required to support pre-defined scanning speed so the pixel size of the imaging device should be selected based on factors described above.

In other embodiments, from experimentation, available line scan imagers can have one or just a few (two to three) lines of photosensitive elements. Also, Time Delayed Integration (TDI) line-scan cameras may be used when multiple sheets of light are used for illuminating the glass panel. Single imager or plurality of staggered imagers are preferably used for 100% glass inspection.

In one mode of operation, the areas of interest (blob) may be extracted from acquired images. If the blob is preliminarily classified as a defect, its position inside the glass is calculated or determined as described above. The method of the disclosure may be seen as a "PSF triangulation method".

Another aspect of the present disclosure is to provide an in-line FPD glass inspection system, designed in correspondence with the method disclosed above.

In particular, the system of the disclosure may detect defects with sizes down to 0.3 μm on the top surface (Surface A) and down to 50 μm on the bottom surface (or Surface B) of FPD glass with thickness ranging from 0.25 mm to 1.1 mm. The system may also classify at which surface the detected defect is positioned. In a preferred embodiment, the system is used for in-line inspection of Generation 10.5 FPD glass (sheet size 2940×3370 mm) with a scanning speed up to 400 mm/sec.

Figure 7:
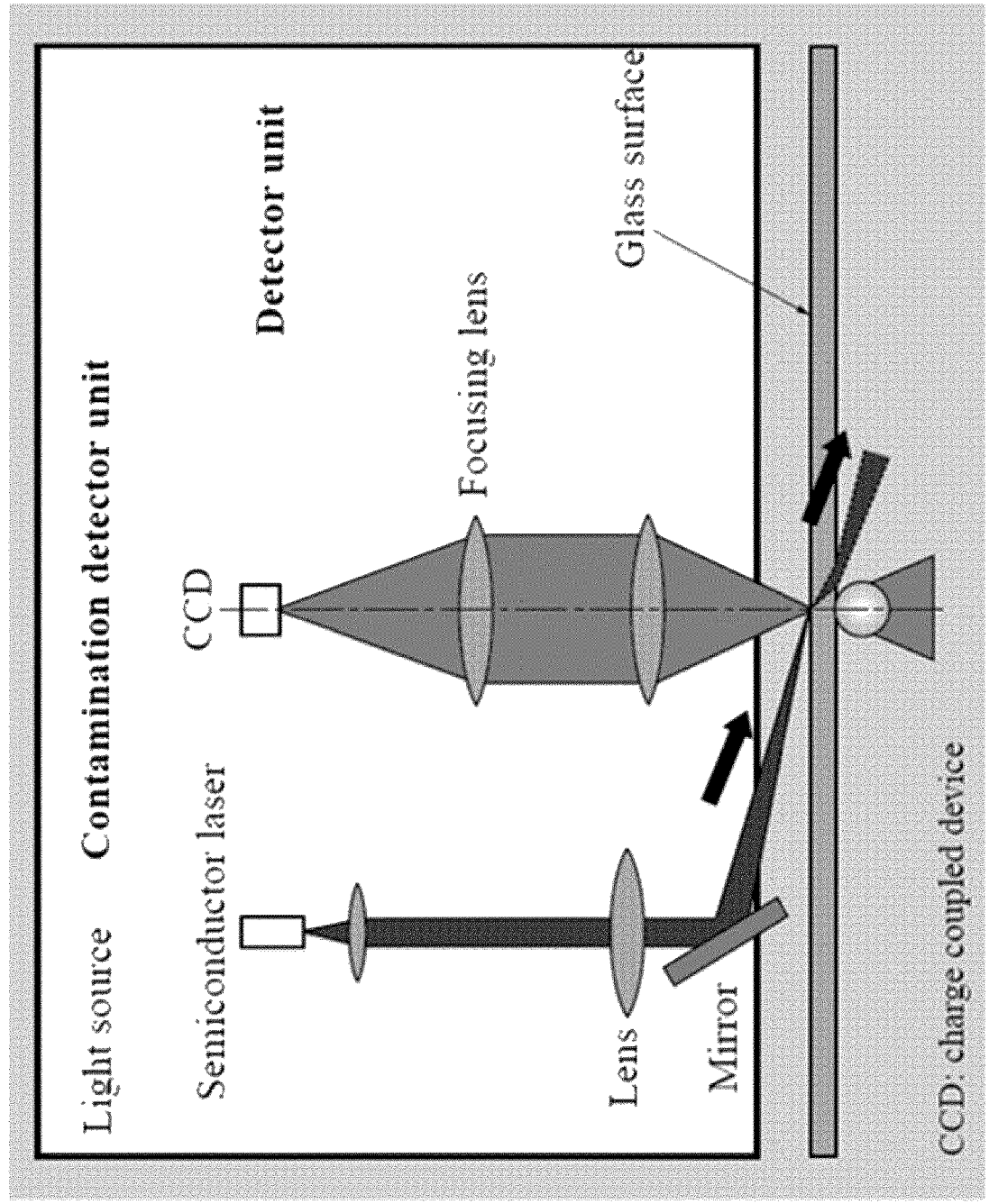
FIG. 7 is a schematic diagram of a prior art inspection system.

One current optical solution, used for FPD glass inspection, is outlined at FIG. 7. According to this solution, the glass top surface is illuminated with single sheet of light within the imaging system FOV. The sheet of light is directed such it illuminates the glass top surface only and creates an unilluminated zone at the glass bottom surface within the imaging system FOV. However, in this system, defects with sizes smaller than 50 μm at Surface B (or the bottom surface) will be ignored or not detected by the system as soon as they fall into a wide enough unilluminated zone. The problem with this solution is that not only defects with sizes smaller than 50 μm but large elongated defects with sizes along a large dimension in excess of 50 μm and sizes along small dimension smaller than 50 μm also may be missed by this system. It may happen because the unilluminated zone at the bottom surface has an elongated shape with length up to several millimeters. In addition, this known system has a relatively small FOV and is used for off-line inspection only.

The method of the disclosure changes the paradigm "illuminated top—unilluminated bottom" to "properly illuminated top and bottom". It reduces or eliminates limitations on the smallest defect sizes which may now be detected on the bottom surface. Their shape may also be determined. Another advantage of the system of the disclosure is that in-line inspection at a scanning speed up to 400 mm/sec may be performed.

Figure 8:
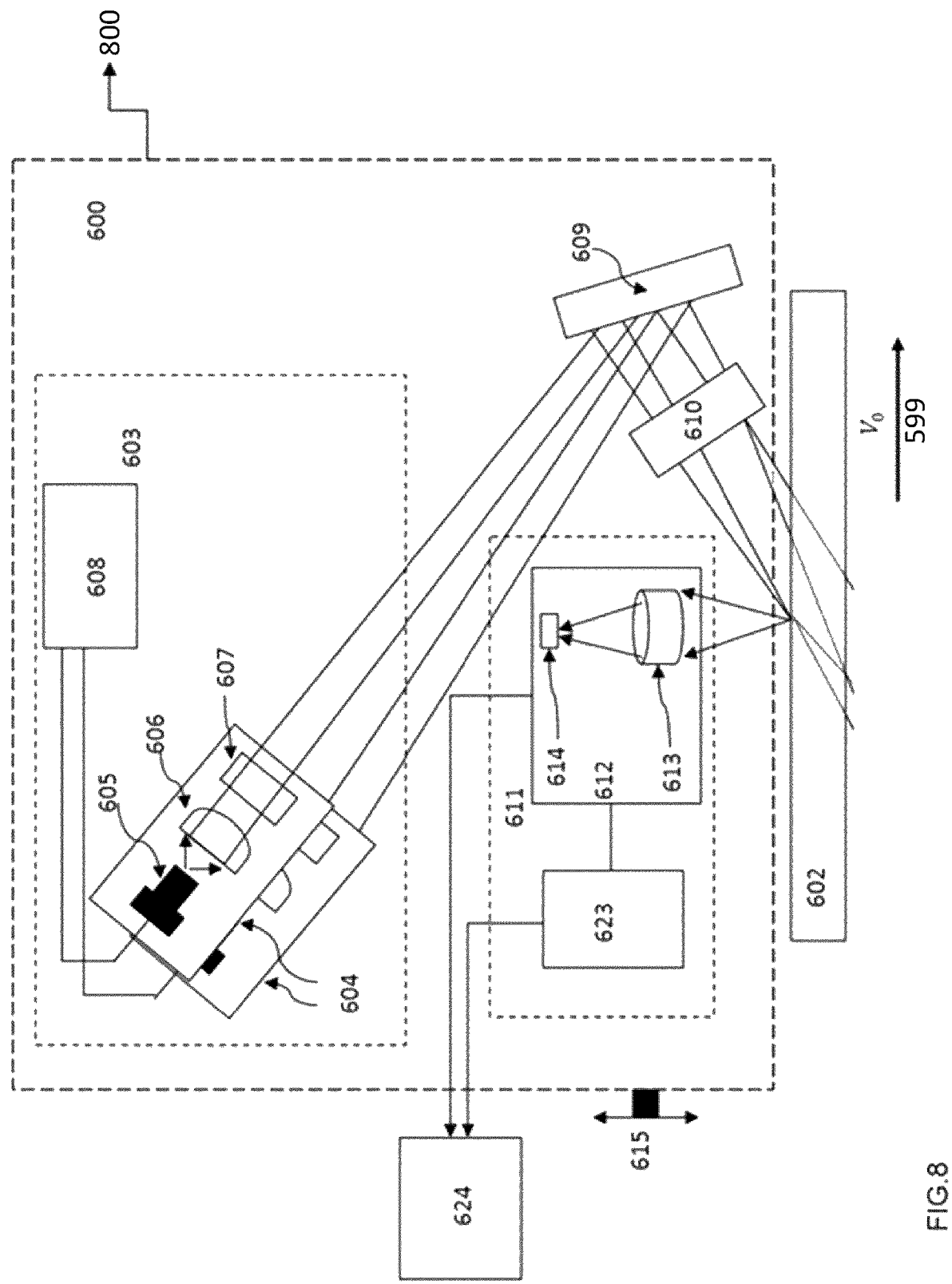
FIG. 8 is a schematic diagram of a system for automated in-line inspection of an optically transparent material.

Turning to FIG. 8, a schematic diagram of a system of the disclosure is shown. The system 800 includes a glass inspection channel 600 for the glass inspection system 800. In the current embodiment, it is assumed that the glass panel being inspected 602 is moving with a constant speed $V_0$ in the direction of arrow 599. The glass inspection channel 600 includes at least one high power illumination modules 603 for generating illumination or the at least one sheet of light. Each illumination module 603 preferably includes a plurality of light sheet generator modules 604 where each light sheet generator module 604 includes at least one semiconductor laser diode 605 for providing light, a lens 606 that creates a collimated or converging beam of light and a line generator 607 that transforms the collimated or converging beam of light into sheets of light collimated or converging in one direction and diverging in an orthogonal direction. Aspheric lenses may be used as lenses 606 while Powell lenses may be used as line generators 607. Each light sheet generator module 604 has apparatus for controlling spatial adjustment or adjustments along the lens 606 optical axis and angular roll, pitch and yaw angles adjustments. These adjustments facilitate individual light sheet orientation relative to focussing module 610 and, hence, relative to the glass panel 602.

Each illumination module 604 is connected to a main power control board 608. As will be understood, one multi-channel power control board 608 may be used for each of the light sheet generator modules 604 installed inside an illumination module although, alternatively, a plurality of power control boards 608 to control individual modules 604 are contemplated to reduce the distance between the board 608 and laser diode 605. In a preferred embodiment, power control boards 608 provide current control for the laser diode 605. In one embodiment, the laser diodes 605 may be high power multi-mode semiconductor laser diodes 605 capable of emitting several watts of optical power in the visible spectral range.

With respect to the laser diodes 605, short wavelength λ light sources are preferred, as many FPD glass defects contain Rayleigh type light scattering areas. Light scattering intensity $I_s$ from these areas increases as $I_s \sim \lambda^{-4}$ as soon as the illumination light wavelength λ decreases. In the same time, making a decision on the illumination light wavelength may include checking the imager spectral response. Optimal wavelength usually is selected based on these two above-mentioned factors.

Turning back to FIG. 8, in the current embodiment, a fold mirror 609 is used to redirect sheets of light from the light illumination modules 604 towards a focussing module 610. The fold mirror and focussing modules are passive optical components. In one embodiment, a first surface mirror may be used as fold mirror 609. Use of the fold mirror 609 reduces the channel 600 size and footprint. In this manner, it also provides a mechanical stiffness enhancement to the channel 600.

In the preferred embodiment, focussing module 610 focuses collimated or converging sheets of light into tightly focused sheets of light. In an alternative embodiment, focussing module 610 can reduce or eliminate the divergence of different sheets of light.

In one mode of operation, one sheet of light illuminates a top surface of the glass panel while a second sheet of light illuminates the bottom surface of the glass panel, however, a single sheet of light may illuminate both the top and bottom surfaces. In a preferred embodiment, the top surface (or Surface A) is illuminated with a sheet of light as wide as 50-90 μm and the bottom surface (or Surface B) is illuminated with a sheet of light as wide as 250-300 μm. It is not preferred to overlap these two sheets of light at the bottom surface of the glass as it may disturb the illumination field uniformity and create unwanted defect image processing problems.

The glass inspection channel 600 further includes an imaging module 611 including an imaging device 612, which in the preferred embodiment is a CIS. The imaging device 612 is positioned relative to glass panel 602 and the sheets of light such that an object plane of the imaging device 612 coincides with the top surface of the glass panel and the CIS FOV is within both illuminated strips or sheets of light. In a preferred embodiment, the imaging device, or CIS, includes an array of gradient lenses 613. If an object is placed into the CIS object plane and illuminated, these lenses create an image of the object in the CIS image plane, where an array of photosensitive elements 614 is installed. In one embodiment, the optical magnification achieved in CIS is M=1.

Imaging module 611 optionally includes an image processing board 623 that may perform obtained image blob extraction, blob categorization and pre-categorized blob dispatching. These images may then be transmitted to an image processing system 624.

If there is no image processing board 623, the imaging device 612 sends or transmits acquired images to the image processing system 624 directly.

To achieve a required or desired illumination pattern at inspected glass panel 602, the distance between inspection channel 600 and the top surface of the glass panel 602 should be kept as prescribed for any inspected glass panel thickness. The prescribed distance is determined based on the CIS being used. If the inspected glass thickness changes due to glass model change, the distance between inspection channel 600 and top surface of the glass 602 is also changed to accommodate for the change in thickness. Taking into account technical difficulties to lift up or lower down the glass conveyor with inspected glass 602, each inspection channel 600 preferably includes a vertical position adjustment mechanism 615.

Being illuminated with light from inspection channel 600, glass defects and objects of interest within or on the surface of the glass panel may reflect the light and scatter it towards the imaging module 611 with a portion of this light reaching entrance pupils of gradient lenses 613. The gradient lenses 613 focus this light in their image plane creating an image of the defect or object of interest.

The array of photosensitive elements 614 then create a pixilated image of the defect or object of interest based on the images created by the individual gradient lenses.

In one embodiment, the pixilated image intensity depends on the generated light intensity of the inspection channel 600. To facilitate reliable detection and imaging for all defects and objects of interest, adequate inspection channel 600 generated light intensity is preferably provided. One way to increase the inspection channel 600 generated light intensity, if required, is to install additional light sheet generator modules 604 into illumination module 603 and install additional fold mirrors 609 and/or additional focussing modules 610. An embodiment with two focussing modules 610 and two fold mirrors 609 is schematically shown at FIG.9.

Figure 9:
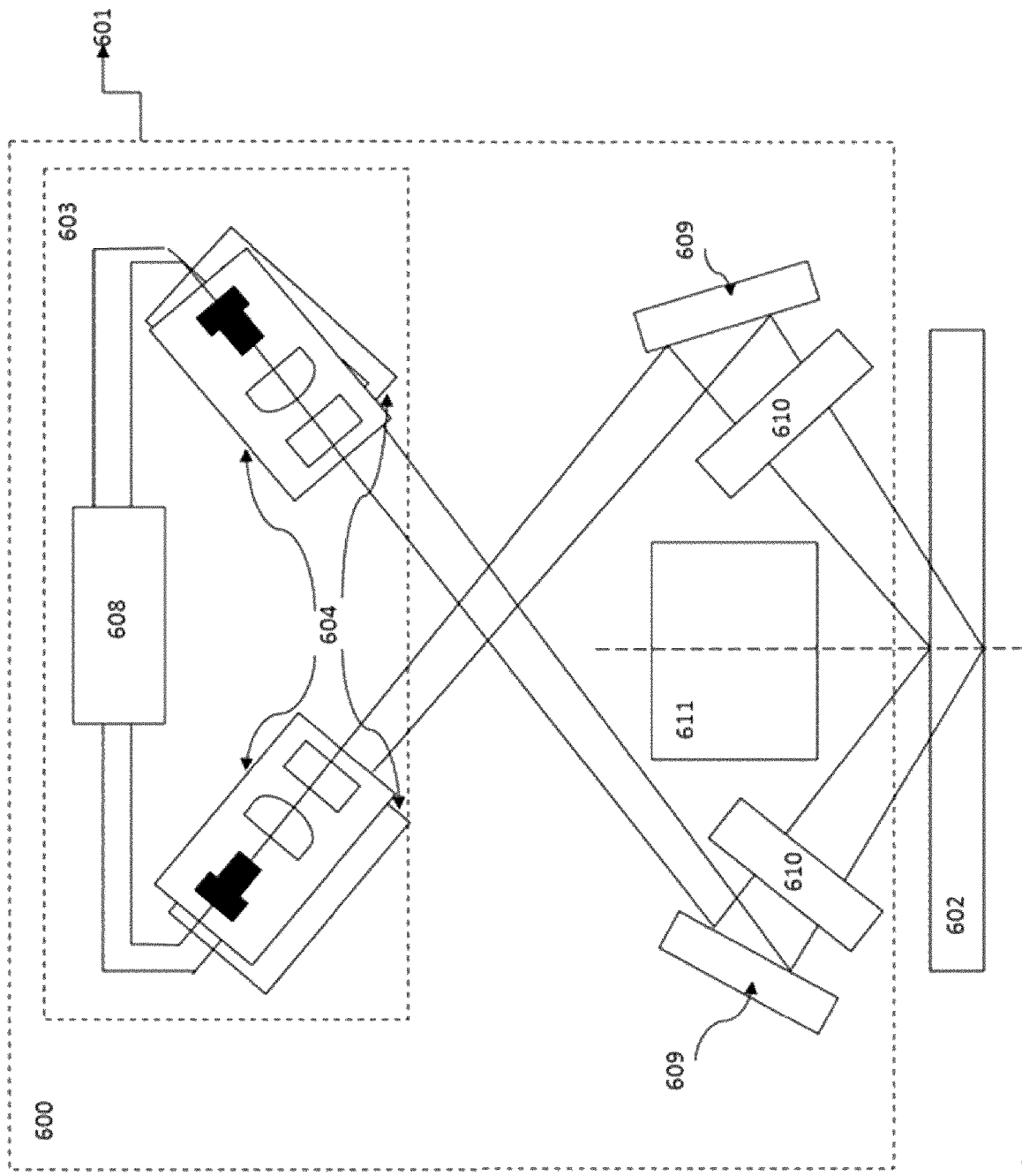
FIG. 9 is a schematic diagram of another system for automated in-line inspection of an optically transparent material.

In the embodiment of FIG. 9, the angles of incidence (A01) for the different light sheets, illuminating the glass panel 602 from upstream and downstream directions, may be different. However, light strip or sheet positions in the imaging device 612 object plane preferably coincide for corresponding light sheets coming from upstream and downstream directions.

Figure 10:
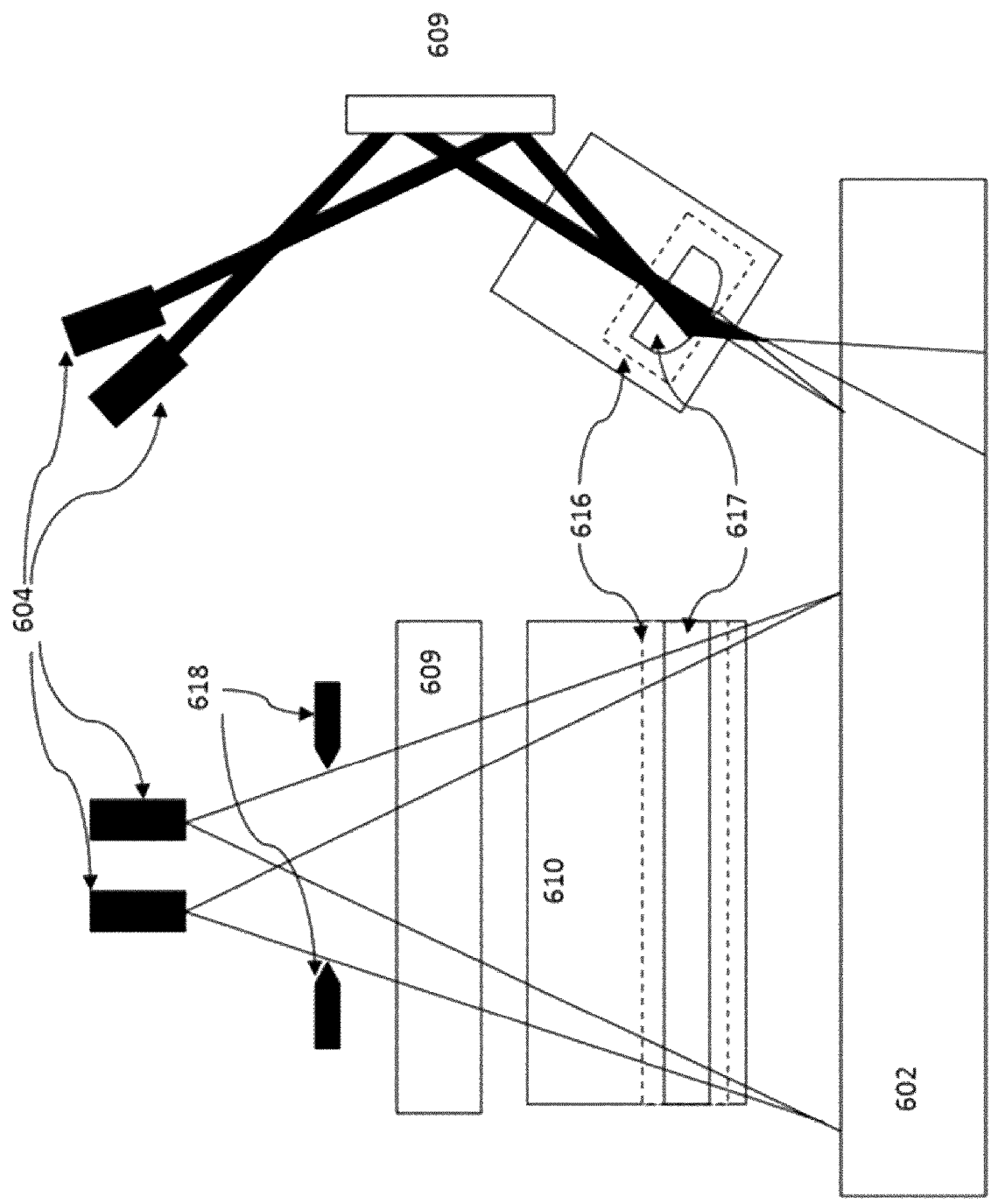
FIG. 10 is a schematic diagram of a focussing module for use with the system of FIG. 8.

Turning to FIG. 10, a schematic diagram of a focussing module 610 is shown. The focussing module 610 includes at least one functional focussing lens group 616. This lens group focuses collimated or converging sheets of light into tightly focused sheets of light.

In a preferred embodiment, the distance, or "safety gap" between imaging device 612 and inspected glass panel 602 is preferably 8-10 mm for safe glass panel transport through the system 800. This distance should not be increased significantly above "safety gap", mentioned above, as it may reduce the numerical aperture (NA) of the imaging device 612, and therefore, its light throughput and resolving power. In a preferred embodiment, the focussing module 610 parameters are designed such that "safety gap" between it and inspected glass panel 602 would be the same or larger than between the imaging device 612 and inspected glass panel 602.

Based on experimentation and research, it is shown that for large variety of defects and objects of interest using the dark field illumination configuration, an A01 close to 0° provides the highest reflected and scattered light intensity in the image plane of the imaging device 612. Setting the illumination A01 close to 0°, however, makes it difficult to fulfill the requirement that one sheet of light illuminates a narrow strip on the top surface of the glass within the imaging module FOV and does not illuminate the bottom surface of the glass within the imaging module FOV and another sheet of light illuminates a wide strip on the bottom surface of the glass within imaging module FOV and does not illuminate the top surface of the glass within imaging module FOV.

Typical AOI which would fulfill the requirements and still provide good defects and objects of interest visibility are around 45°, however, this requires that the distance from the back surface of the last lens in focussing module 610 to the imaging device 612 FOV area at inspected glass panel 602 be about 25 to 35 mm.

This requirement should be taken into account when selecting the optical design of the functional lens group 616. In order to focus collimated or converging sheets of light into tightly focused sheets of light, a single or plurality of cylindrical lenses 617 are preferably used. While Fresnel cylindrical lenses are preferred, their implementation will likely require 1-D engineering diffuser installation for coherent light irregularities suppression.

In the embodiment of FIG. 10, one pair of light sheet generator modules 604 and one cylindrical lens long focussing module 610 are shown.

In operation, diverging sheets of light reach inspected glass panel 602 without touching cylindrical lens edges. To set the illuminated area width accurately, spatial filters 618 are used. Additionally optional blade type spatial filters may be installed inside the channel 600 in different positions to provide uniform intensity distribution of the light sheets and parasitic light reflections suppression.

Figure 11:
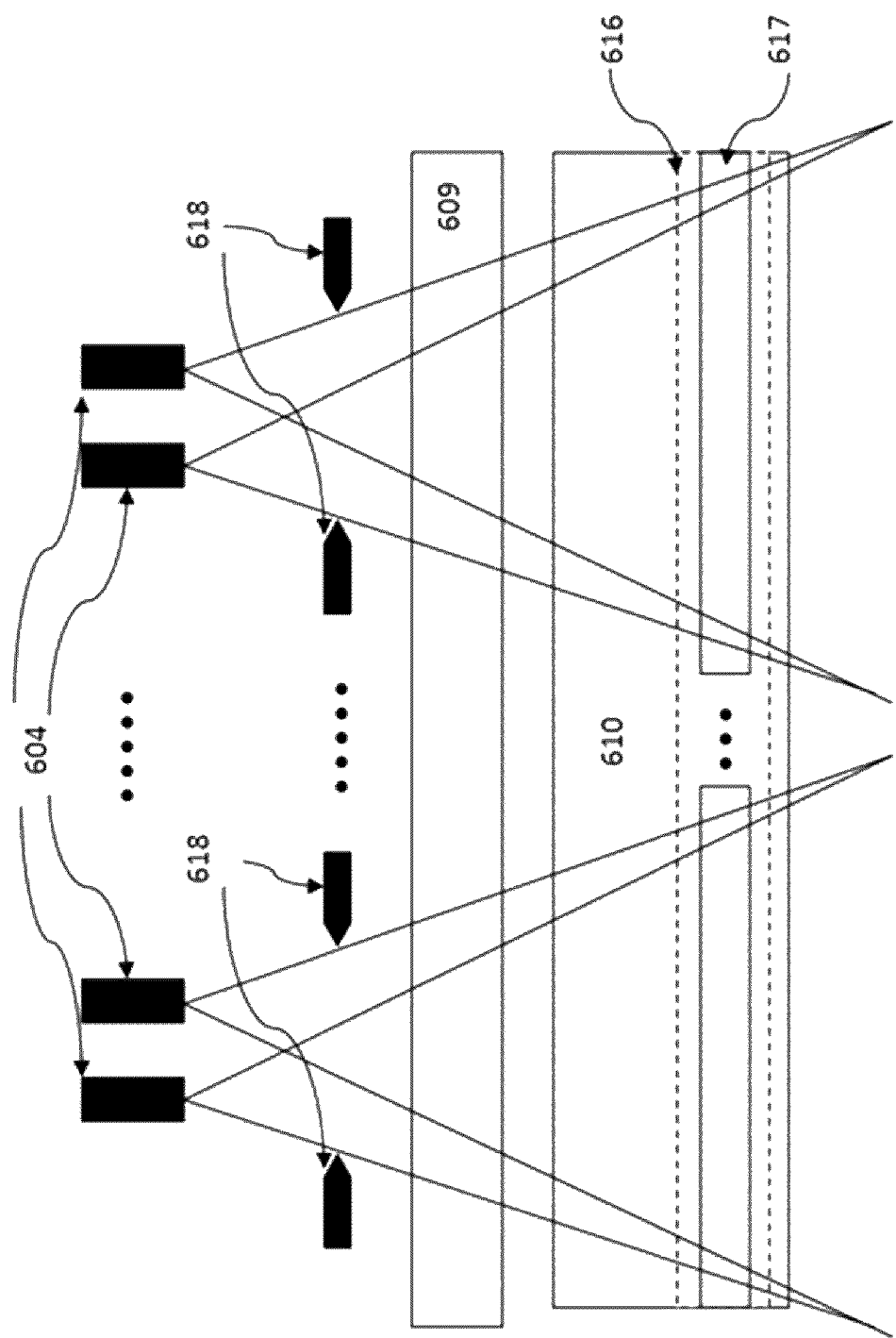
FIG. 11 is a schematic diagram of another focussing module for use with the system of FIG. 8.

Cylindrical lens length, L, usually is limited by optical production capabilities wherein L is approximately 400-450 mm. If a longer area is required to be illuminated, a row of identical functional focussing lens groups 616 may be including in focussing module 610 such as schematically shown in FIG. 11.

Figure 12:
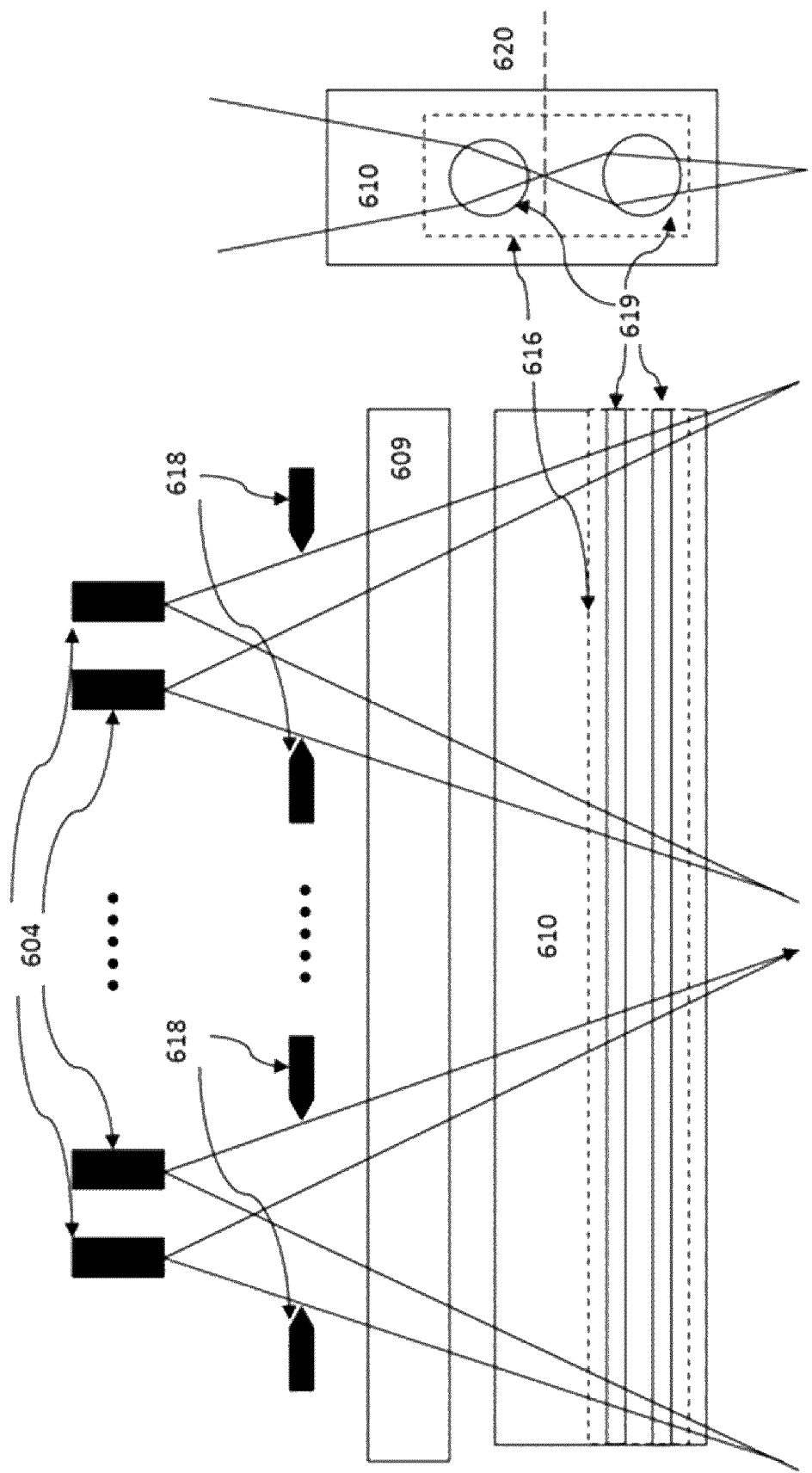
FIG. 12 is a schematic diagram of yet another focussing module for use with the system of FIG. 8.

Turning to the embodiment of FIG. 12, another embodiment of a focussing module is shown. In the current embodiment, glass rods 619 may be used as the cylindrical lenses 617. In the current embodiment, the glass rods 619 rods may have length in excess of 1000 mm. Illumination from several pairs of light sheet generator modules 604 may be combined to increase the light intensity. In the current embodiment, two glass rods are required to create the tightly focused sheet of light. One rod creates an elongated laser diode emitter image in the intermediate image plane 620 while the second rod projects this image onto the inspected glass panel 602 to fulfill the requirement that the distance from back surface of the last lens in the focussing module 610 to the imaging device 612 FOV area at inspected glass panel 602 be approximately 25 to 35 mm.

To reduce spherical aberrations and get small light strip width at the top surface of the inspected glass panel 602, the light sheet width at entrance pupil of the first rod is preferably less than about 3 mm. In this case the light beam exiting lens 606 should be preferably converging. Although two glass rods may not be able to create or generate a light strip as narrow as a single best form cylindrical lens, the width of the light strips created by glass rods may be narrow enough to satisfy the application requirements.

Figure 13:
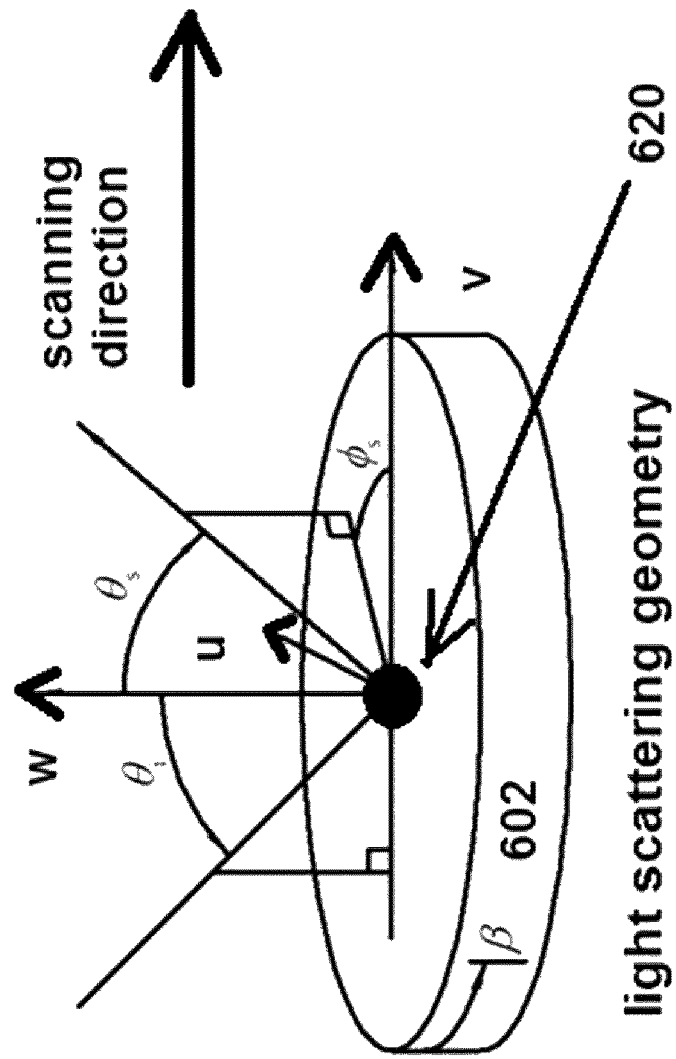
FIG. 13 is a schematic diagram of incident and scattered light geometry for a defect or object of interest.

Another issue addressed by the system of the disclosure is bidirectional reflectance Function (BDRF). BDRF relates to the scattered and reflected light intensity generated by the defect or object of interest. This function depends on glass substrate refractive index; defect or object of interest size, shape and refractive index; and incident light wavelength, polarization state and direction. The incident and scattered light geometry onto defect or object of interest 620 is schematically presented at FIG. 13.

For a given substrate material, particle size, shape and refractive index, incident light wavelength, polarization state and direction, defined by angles $\theta_i$ and $\beta$, BDRF defines a portion of incident light, scattered/reflected in direction, defined by angles $\theta_s$ and $\phi_s$.

Angle $\theta_i$ is about the same for all glass areas inside the illuminated imager 612 FOV. Angle $\beta$, however, is different for different glass areas inside the imager 612 FOV, illuminated with focussing modules 610, built in correspondence with embodiments described above.

Hence, BDRF for the same defect or object of interest, placed in different areas of the imager 612 FOV may be different for the same angles $\theta_s$ and $\phi_s$. As a result, the same defect or object of interest being placed into different imager FOV areas may produce images with different intensity. This may affect the system defect detection and classification capabilities. Currently, scattering efficiency difference over imager FOV routinely is compensated with appropriate calibration procedures performed with the system firmware/software.

To address possible inefficiency of the calibration procedures with the system of the disclosure, the focussing module 610 may be modified such that all areas within imager 612 FOV are illuminated with the same or almost the same angle $\beta$. In this way, the BDRF for any defect or object of interest, being placed in the same orientation in any imager 612 FOV area will be the same or almost the same for given angles $\theta_s$ and $\phi_s$. Hence, images for the defect or object of interest will have the same or almost the same light intensity, regardless inspected area position inside the imager 612 FOV.

Figure 14:
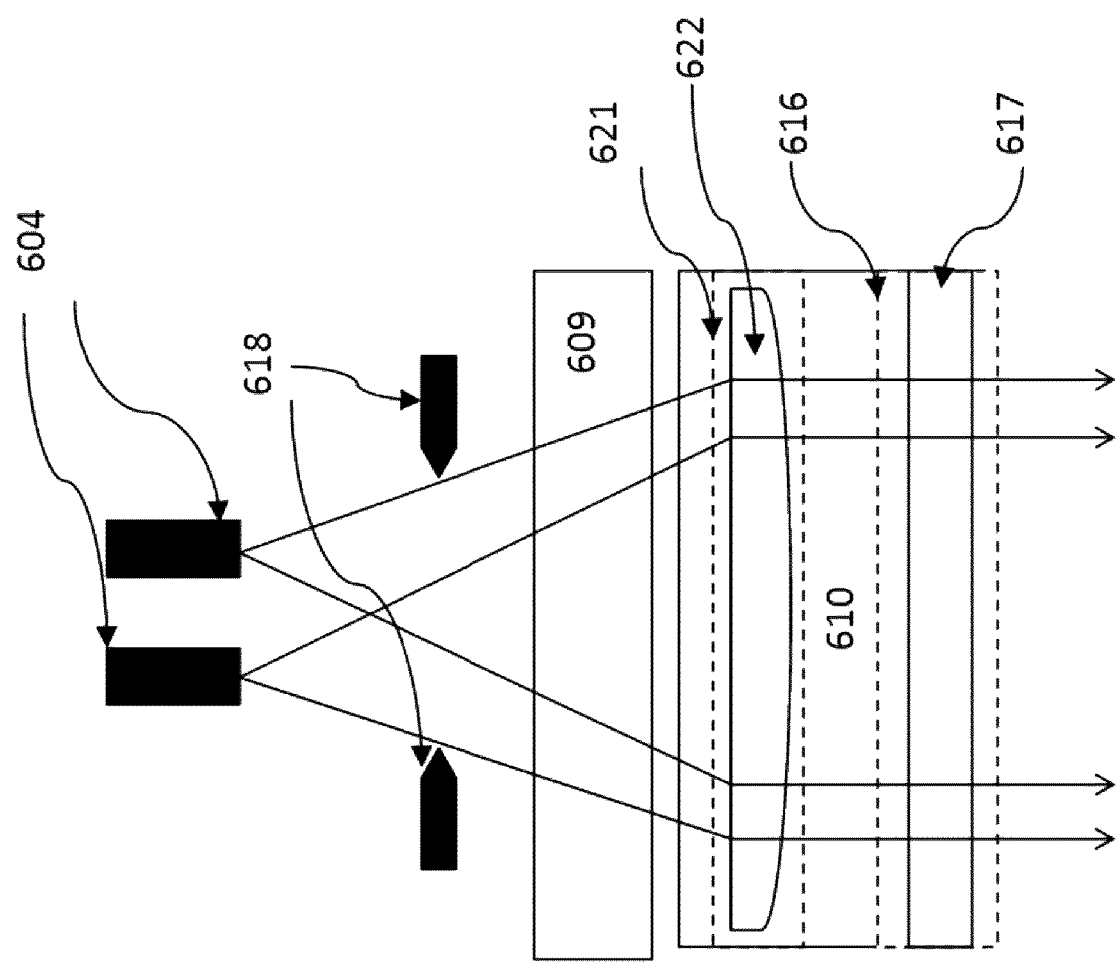
FIG. 14 is a schematic diagram of yet another focussing module for use with the system of FIG. 8.

To achieve angle $\beta$ equalization over the imager 612 FOV, one or more additional functional collimating lens groups 621 may be included in the focussing module 610. This is schematically shown in FIG. 14 which is an embodiment with two functional lens groups 616 and 621 installed into focussing module 610. Collimating lens group 621 includes a single or plurality of long focal distance cylindrical or spherical lenses 622. As outlined above, Fresnel cylindrical and spherical lenses also may be used, but their implementation the most likely will require 1-D engineering diffuser installation for coherent light irregularities suppression.

The focal distances of the lenses 622 and their positions are selected such that their focal planes coincide or almost coincide with an intermediate image plane created by lens 606 and line generator 607 inside the line generator. Depending on the functional lens group 616 distance to laser diode 605 emitter intermediate image plane, the light sheets on output from focussing module 610 will be collimated or almost collimated in a predetermined, such as the u, direction. In this manner, angle $\beta$ equalization over imager FOV is achieved. If long focal distance spherical lenses are used in collimating lens group 621, the fact they additionally focus the light sheets should be taken into account at a time of the module 610 optical design.

In some specific embodiments, a CIS with "pixel density" 600 dpi (dots-per-inch) may be used as imaging device 612.

Scanning speed, achieved with these CIS may exceed V=1000 mm/sec provided that adequate illumination is available. The CIS preferably includes arrays of gradient lenses 613, which provide coherent PSF width~250 μm for defects and objects of interest inside the CIS DOF. One can notice: the CIS pixel size is smaller than coherent PSF~6 times. The use of these CIS assists in the method of the disclosure. In a preferred embodiment of the disclosure, a 600 dpi CIS with a scanning spend of 250 mm/sec is used with a light source generating at least one light sheet with surface power density at 0.5 W/mm$^2$.

Direct image transfer from imaging device 612 to external image processing system 624 is not preferred imaging module architecture. The preferred imaging module 611 architecture undermines sending imaging device 612 acquired image fragments to the image processing board 623, installed in the same compartment as imaging device 612. Image processing board performs obtained image fragment blob extraction, categorization and sending pre-categorized bobs out for detailed processing by image processing system 624. The rest of the image acquired is discarded. This architecture allows for reduced data transfer rates between inspection channels 600 and image processing system 624.

Figure 15:
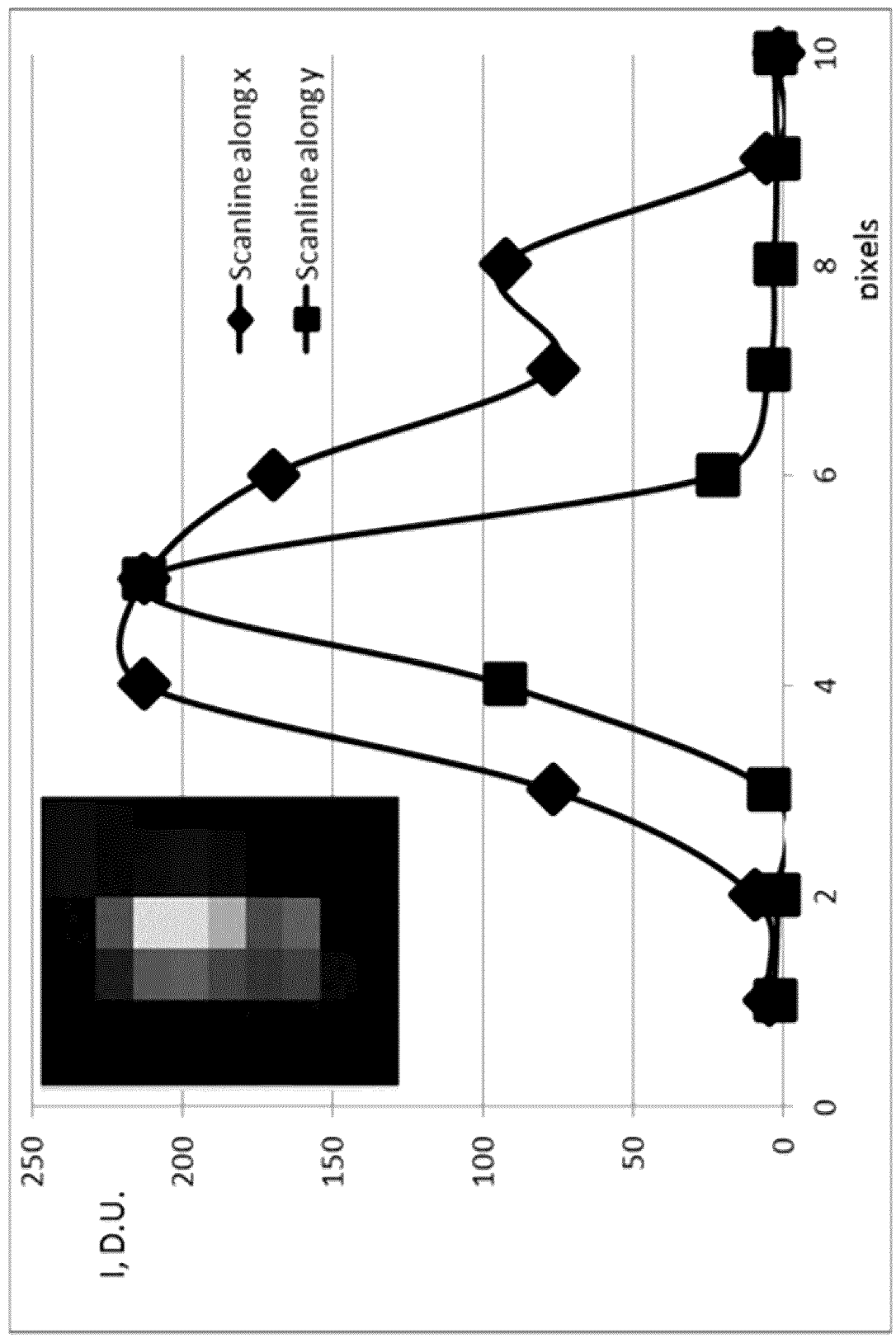
FIGS. 15 and 16 are images generated by the system of the disclosure.
Figure 16:
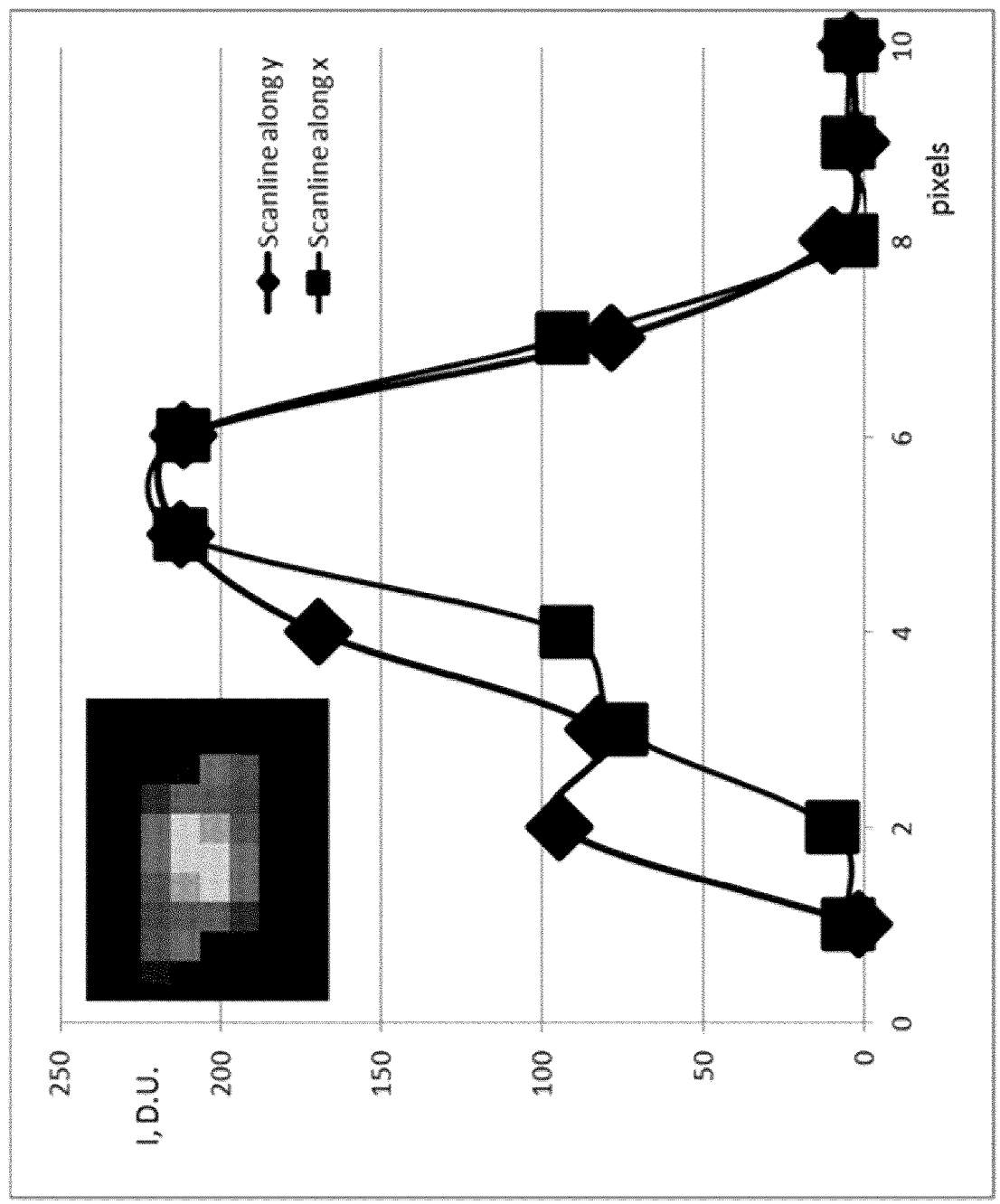

Blob examples generated by an imaging module 611 and transmitted to external image processing system are shown in FIGS. 15 and 16.

FIG. 15 presents a blob image including a D=20 μm calibrated polystyrene sphere image, obtained where the sphere image is positioned at the inspected FPD glass top surface (Surface A). It also presents the blob intensity plots in x and y directions. The blob is reliably categorized as particle on the inspected glass top surface.

FIG. 16 presents a blob image including a D=20 μm calibrated polystyrene sphere image, obtained where the sphere image is positioned at the inspected FPD glass bottom surface (Surface B). It also presents the blob intensity plots in x and y directions. The blob is reliably categorized as particle on the inspected glass bottom surface.

In this experiment, FPD glass thickness was h=0.31 mm. Signal level in 213 Digital Units (D.U.) corresponds to CIS saturation level after the CIS background was digitally subtracted from the image. The inspected glass panel 602 bottom surface was illuminated with a higher light intensity to achieve identical defect image intensities for both surfaces.

Figure 17:
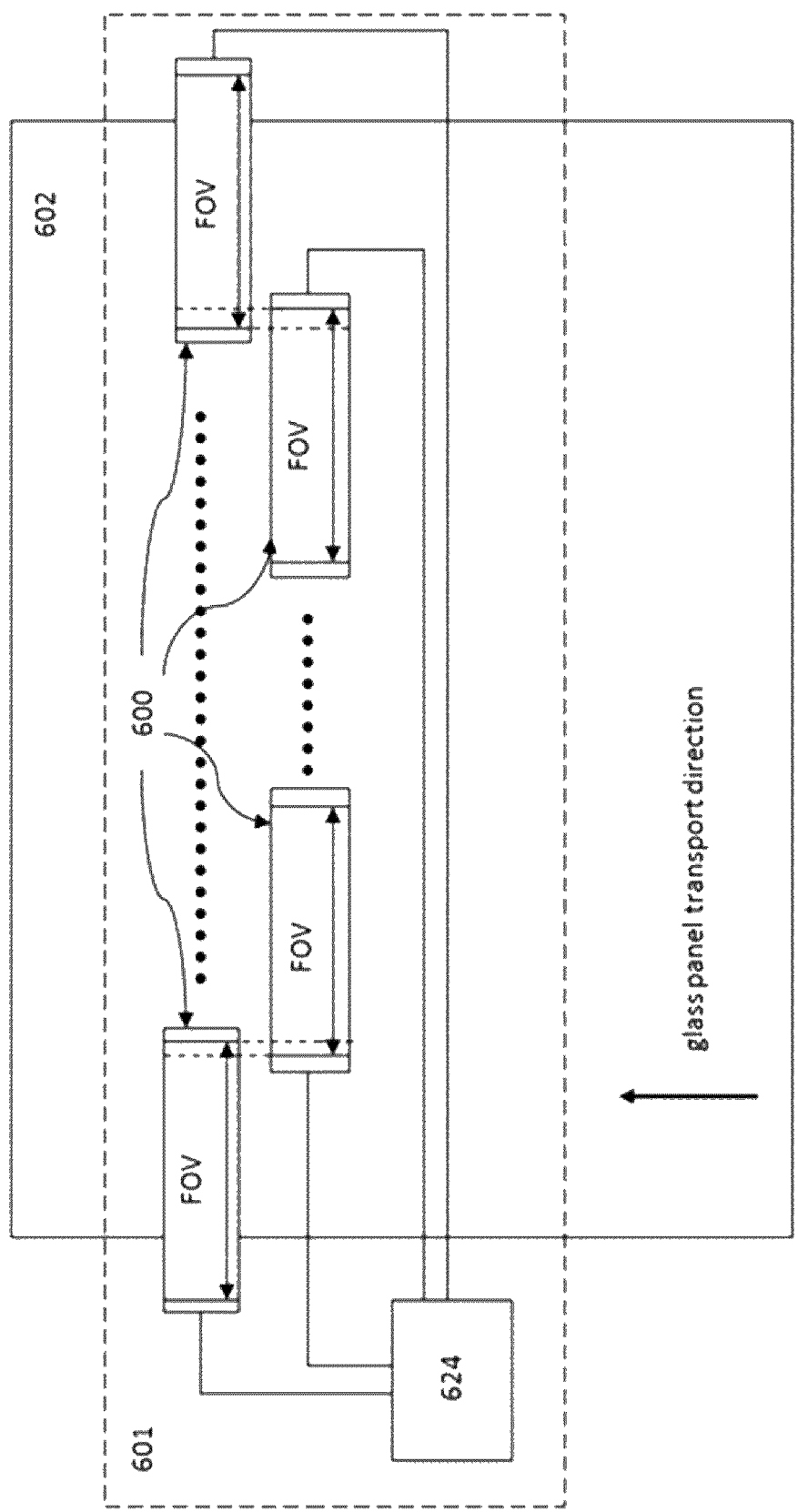
FIG. 17 is another embodiment of a glass inspection system.

Turning to FIG. 17, another embodiment of a glass inspection system is shown. The glass inspection system 601 may include one or plurality of glass inspection channels 600 to cover the whole inspected glass panel width. If several glass inspection channels 600 are required to accomplish this task, they should be positioned in staggered way having overlap between their individual FOV.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A method of transparent optical material inspection comprising:
    transmitting at least one sheet of light at an object of interest associated with the transparent optical material;
    receiving light at an imaging device after the at least one sheet of light has contacted the transparent optical material; and
    generating an image based on the received light;
    wherein a width of at least one of the at least one sheet of light is not wider than a point spread function (PSF) of the imaging device;
    where the PSF of the imaging represents an imaging device response to a point light source placed in an object plane of the imaging device.

2. The method of claim 1 wherein transmitting at least one sheet of light comprises:
    transmitting the at least one sheet of light at a top surface and a bottom surface of the transparent optical material.

3. The method of claim 2 wherein a width of the at least sheet of light at the top surface is narrower than a width of the at least one sheet of light at the bottom surface.

4. The method of claim 3 wherein transmitting the at least one sheet of light at a top surface and a bottom surface of the transparent optical material comprises:
    transmitting a first sheet of light at the top surface; and
    transmitting a second sheet of light at the bottom surface.

5. The method of claim 1 wherein receiving light at an imaging device comprises:
    for a bright field configuration, receiving light that has passed through the transparent optical material.

6. The method of claim 1 wherein receiving light at an imaging device comprises:
    for a dark field configuration, receiving scattered, reflected or refracted light after the light has passed through the transparent optical material.

7. The method of claim 4 wherein transmitting the first and second sheets of light comprises:
    transmitting the first sheet light from a position opposite the imaging device with respect to the transparent optical material; and
    transmitting the second sheet of light from a position opposite the imaging device with respect to the transparent optical material.

8. The method of claim 4 wherein transmitting the first and second sheets of light comprises:
    transmitting a sheet of light towards a beam splitter;
    beam-splitting the sheet of light and directing a first portion of the beam-split light as the first sheet of light towards the transparent optical material.

9. The method of claim 8 further comprising directing a second portion of the beam-split light as the second sheet of light towards the transparent optical material.

10. The method of claim 1 wherein the at least one sheet of light is diverged or converged towards the object of interest.

11. The method of claim 4 wherein the first sheet of light is transmitted within a field of view (FOV) of the imaging device.

12. The method of claim 4 wherein the second sheet of light is transmitted within a field of view (FOV) of the imaging device.

13. The method of claim 11 wherein the second sheet of light is transmitted within a field of view (FOV) of the imaging device.

14. The method of claim 1 further comprising:
    transmitting the image to an image processing device to determine location of the object of interest associated with optically transparent material.

15. A system for transparent optical material inspection comprising:
    an imaging device;
    at least one source of light for transmitting at least one sheet of light at an object of interest associated with transparent optical material;
    wherein at least one of the at least one sheet of light has a width narrower than a point spread function (PSF) of the imaging device;
    where the PSF of the imaging device represents an imaging device response to a point light source placed in an object plane of the imaging device.

16. The system of claim 15 further comprising:
    a conveyor system for supporting and moving the transparent optical material;
    wherein the imaging device is a line-scan imager.

17. The system of claim 15 wherein the at least one source of light transmits a first sheet of light at a Surface A of the transparent optical material and a second sheet of light at a Surface B of the transparent optical material.

18. The system of claim 17 wherein the at least one source of light comprises two sources of light, one of the sources of light for generating the first sheet of light and a second of the sources of light for generating the second sheet of light.

19. The method of claim 1 wherein the PSF of the imaging device depends on parameters $\xi$, $\eta$, u, v where u and v represent coordinates in the object plane of the imaging device; ξ=x/M; η=y/M where x and y represent coordinates in an image plane of the imaging device image plane and M represents an imaging device optical magnification.

20. The system of claim 15 wherein the PSF of the imaging device depends on parameters ξ, η, u, v where u and v represent coordinates in the object plane of the imaging device; ξ=x/M; η=y/M where x and y represent coordinates in an image plane of the imaging device image plane and M represents an imaging device optical magnification.

\* \* \* \* \*